May 7, 1963 G. E. RHODES 3,089,121

DIGITAL COMPARATOR

Filed Dec. 24, 1958 5 Sheets-Sheet 1

INVENTOR.
GERALD E. RHODES

BY L. Lee Humphries

ATTORNEY

INVENTOR.
GERALD E. RHODES
BY L. Lee Humphries
ATTORNEY

May 7, 1963 G. E. RHODES 3,089,121

DIGITAL COMPARATOR

Filed Dec. 24, 1958 5 Sheets-Sheet 3

INVENTOR.
GERALD E. RHODES

BY L. Lee Humphries

ATTORNEY

INVENTOR.
GERALD E. RHODES
BY L. Lee Humphries
ATTORNEY

May 7, 1963 G. E. RHODES 3,089,121

DIGITAL COMPARATOR

Filed Dec. 24, 1958 5 Sheets-Sheet 5

INVENTOR.
GERALD E. RHODES
BY L. Lee Humphries
ATTORNEY

United States Patent Office 3,089,121

Patented May 7, 1963

3,089,121

DIGITAL COMPARATOR

Gerald E. Rhodes, Garden Grove, Calif., assignor to North American Aviation, Inc.

Filed Dec. 24, 1958, Ser. No. 782,761
10 Claims. (Cl. 340—146.2)

This invention relates to a comparator, and it more particularly relates to a comparator which will indicate the relative values of two numbers in digital form.

In the comparison of digital numbers, it is often necessary to provide complex logic structure to compare the various digits of the two numbers. For example, in the comparison of the number stored in a first counter with a number stored in a second counter, it may be necessary to compare each stage with its corresponding stage in the other counter and then, in addition, it may be necessary to provide means for transferring a carry indication from one end of the counter to the other so that the comparison between more significant stages will control the comparison between the less significant stages. There is then a comparative circuit and a carry circuit in such devices. A binary system, one having two, readily recognizable, discrete, numerical values must be modified somehow in order to provide a third output. Such third output may be desired in a comparator, for not only is it desired to know whether one quantity is higher or lower than another, it is desired to know if it is equal to the other. Therefore, a device such as illustrated in this invention provides an indication not only of when the two compared numbers are unequal, but also indicates which is higher than the other or, conversely, which is lower than the other.

A comparison system should be readily adaptable to the many forms of storage or handling of digital numbers and the numerical indicators presently used. A digital number may be expressed by relay trees. A digital number may also be expressed by arcuate sectors of a circle or also a digital number may be expressed by a location, as for example, on a tape in which the given location stands for a given number (as also occurs on punched cards).

The digital comparator should be relatively simple in structure and readily serviceable. Aside from the expense of manufacturing a complex comparator, there is the expense of maintaining and servicing which must also be taken into account in the design of a desirable digital comparator. The device of the invention is of simple construction and is economical and easily checked for malfunction or for maintenance purposes. It is readily adaptable to the various systems utilized for handling digital numbers such as counters, switch trees, dial or pointer systems or other systems which may, for example, represent values by given shaft positions. It provides a ready, positive indication of the relationship between two values, that is, whether one is equal to another or less than, or more than.

The comparator, of course, may be used in a variety of closed loop systems in which the indication of the comparator is utilized to adjust one of the numbers being compared so that it is equal to the other number. For example, a reference value may be provided and it may be desired to drive another register or another motor according to the reference value. The device of the invention therefore, providing a comparison, is able to provide a signal which may be used to actuate the other register or motor so that the referenced value is followed. The comparator, therefore, provides an indication of sense, that is, whether or not one value is higher or lower than another value as well as whether or not they are equal or unequal. Such indication of sense may be utilized to provide, for example, a directional signal to a motor. It may also be appreciated that such servo loop need not be a nulling servo and may be connected so as to prevent the numbers from being the same.

There are some situations in which it is desired that a value fall within a given tolerance. For example, a high limit may be supplied as a reference value and also a low limit may be supplied. The comparator herein is readily adapted to such systems by reason of the fact that it can readily indicate whether one of two numbers is higher or lower than another or in a third situation which it is equal to it. Therefore, a first comparison may be made with the high limit and then a second comparison may be made with a low limit and as a result of the two readings, it may be determined whether or not the value being read falls within a tolerable range.

It is an object of this invention to provide a comparator.

It is another object of this invention to provide an improved digital comparator.

It is another object of this invention to provide a digital comparator which is relatively economical to construct and to maintain.

Another object of this invention is to provide a comparator which is readily adaptable to compare the numbers represented in many types of devices.

Still another object of this invention is to provide a digital comparator which indicates equality or inequality of two digital values and, further, indicates which of two values is the higher.

Another object of this invention is to provide a digital comparator which indicates whether or not an unknown digital quantity falls within an acceptable limit.

It is still another object of this invention to provide a digital comparator which provides a signal which may be used to control the value stored in a digital storage device.

Still another object of this invention is to provide a digital comparator which provides a signal which may be used to indicate the position a mechanical device should attain.

A final object of this invention is to provide a digital comparator which provides a signal which may be utilized to rotate a motor so as to position a shaft.

Other objects of this invention will become apparent from the following description taken in connection with the accompanying drawings in which—

Figure 1:
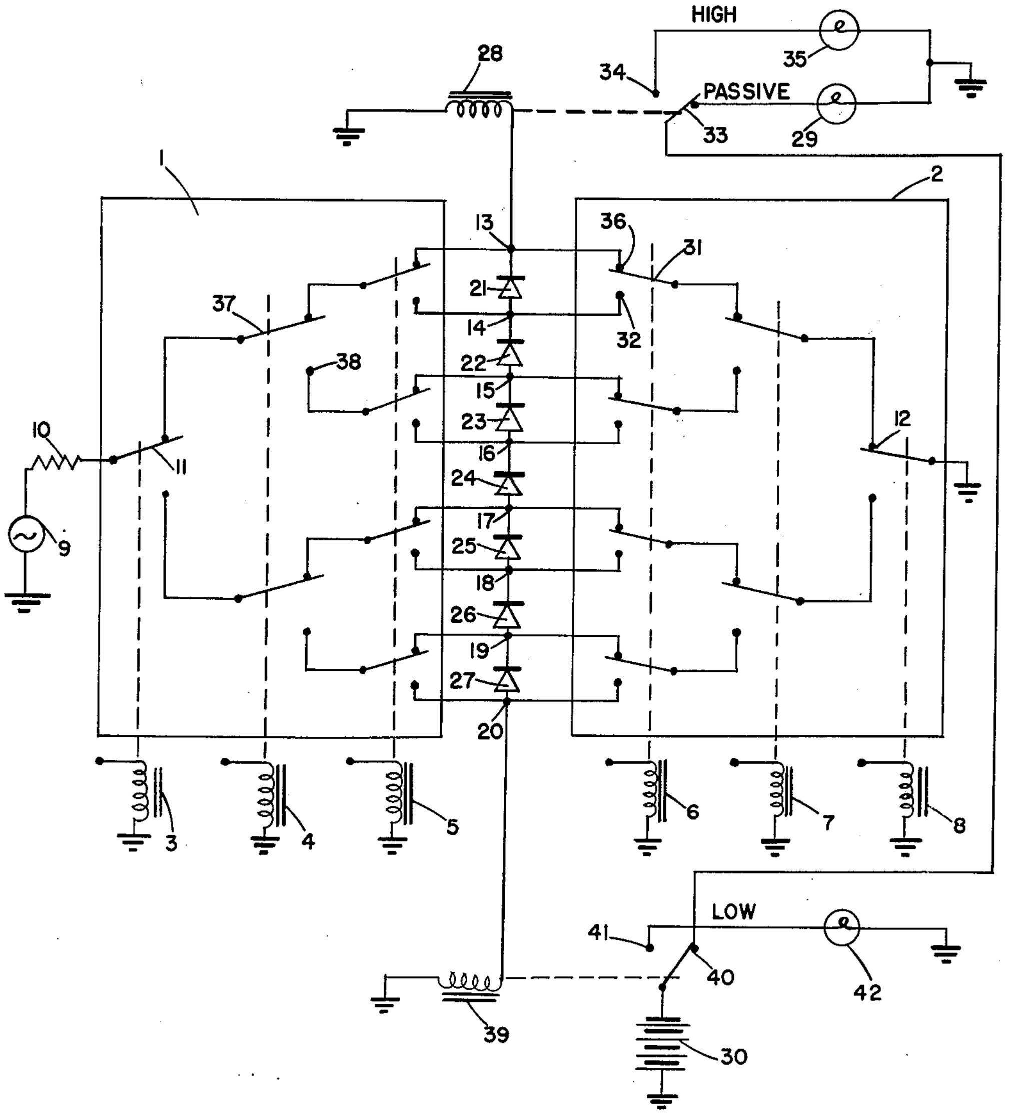
FIG. 1 is an illustration of the digital comparator comparing the settings of two relay trees and indicating which is set higher or lower than the other, or whether or not they are set at equal values.

Referring now to FIG. 1, there is shown a numerical indicator, such as relay tree at 1 and a second numerical indicator, relay tree at 2. The switches of relay tree 1 are controlled by solenoids 3, 4 and 5. The switches of relay tree 2 are controlled by solenoids 6, 7 and 8. It may be readily seen how a digital binary number is utilized to control the relay tree, that is, relay 3 representing one bit of a digital binary number, relay 4 another, and relay 5 still another, etc. The same may be said with respect to solenoids 6, 7 and 8 representing a binary number which causes a particular setting of the switches in relay tree 2. Connected to provide an alternating current to relay tree 1 are an alternating current source 9, a current limiting resistor 10, connected in series from ground to the first switch 11 of relay tree 11. For comparison, the first switch 12 of relay tree 2 is connected to ground. The outputs of relay tree 1 are connected to connection points 13 through 20 which are connected together by diodes 21 through 27. The outputs of relay tree 2 are likewise connected to connection points 13 through 20. It may be seen then that there is provided several connection points (13 through 20) which receive and compare the values stored in two storage devices (the relay trees). These connections are connected together by diodes. In the illustration of FIG. 1, an input connection from source 9 through resistor 10 is connected to some connection point, say 13, and a return path is provided for the alternating current source by relay tree 2. The return connection is through switch 12 to ground. If, as just explained, alternating current source 9 is connected to point 13 and also, if the ground return is also connected to point 13 by means of switch 12, no voltage will be developed at 13 and no current will flow in relay 28. Therefore, light 29 will remain lighted by direct current source 30. If, however, switch 31 in tree 2 were thrown to contact 32, a half-wave rectified, positive output would be received at relay 28 which would cause switch 33 to contact point 34 and light 35 would be turned on by direct current source 30. Therefore, light 29 indicates that the digital binary numbers stored in solenoids 3, 4, or 5 (or in relay tree 1) is equal to the digital binary numbers stored in solenoids 6, 7 and 8 (or relay tree 2). Light 35 indicates that the digital binary numbers stored in relay tree 1 exceeds the numbers stored in relay tree 2. If on the other hand switch 31 contacts point 36 and switch 37 contacts point 38, a negative, half-wave rectified signal will be received at relay 39 and switch 40 will be thrown to point 41 and light 42 will be energized by source 30 in which case it is indicated that relay tree 1 is less than the value stored in relay tree 2.

Figure 2:
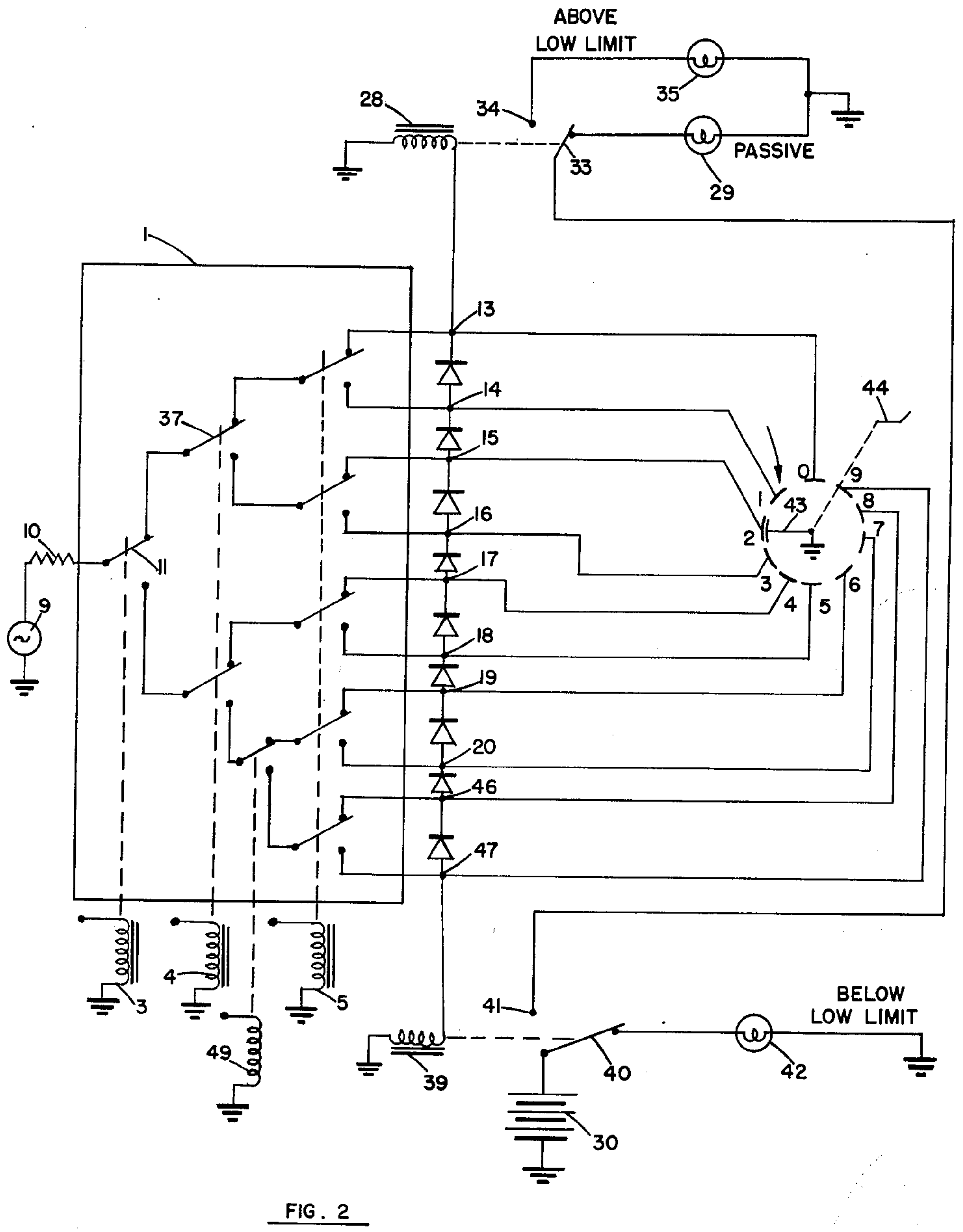
FIG. 2 illustrates the use of the digital comparator for comparing a relay tree with a switch having arcuate sectors assigned particular values.

It may be understood that the comparator may be utilized to provide comparison between devices or numerical indicators which are not necessarily binary in form. For example, there is shown in FIG. 2 a numerical indicator which is a switch having ten successive positions of switch arm 43 controlled by crank 44. The switch 45 is shown as a decimal indicator and it may be seen that the ten switch sectors are connected to points 13 through 20 as in FIG. 1, but with added connections at points 46 and 47. In FIG. 1 eight connections were used, in FIG. 2 the tree 1 is modified to provide an output of ten connections. Therefore, an additional relay 49 is required in addition to relays 3, 4 and 5. The comparator device operates essentially the same with relays 39 and 28 connecting direct current source to one of the three lights, 29, 35 or 42 in accordance with the output received from the diode string.

Due to the circuit configuration this system may be used for digits in a radix numerical system employing any base (i.e., "10" for decimal, "8" for octal, or even "2" for binary). In such case there will be a diode in the "diode string" for each numerical character.

Figure 3:
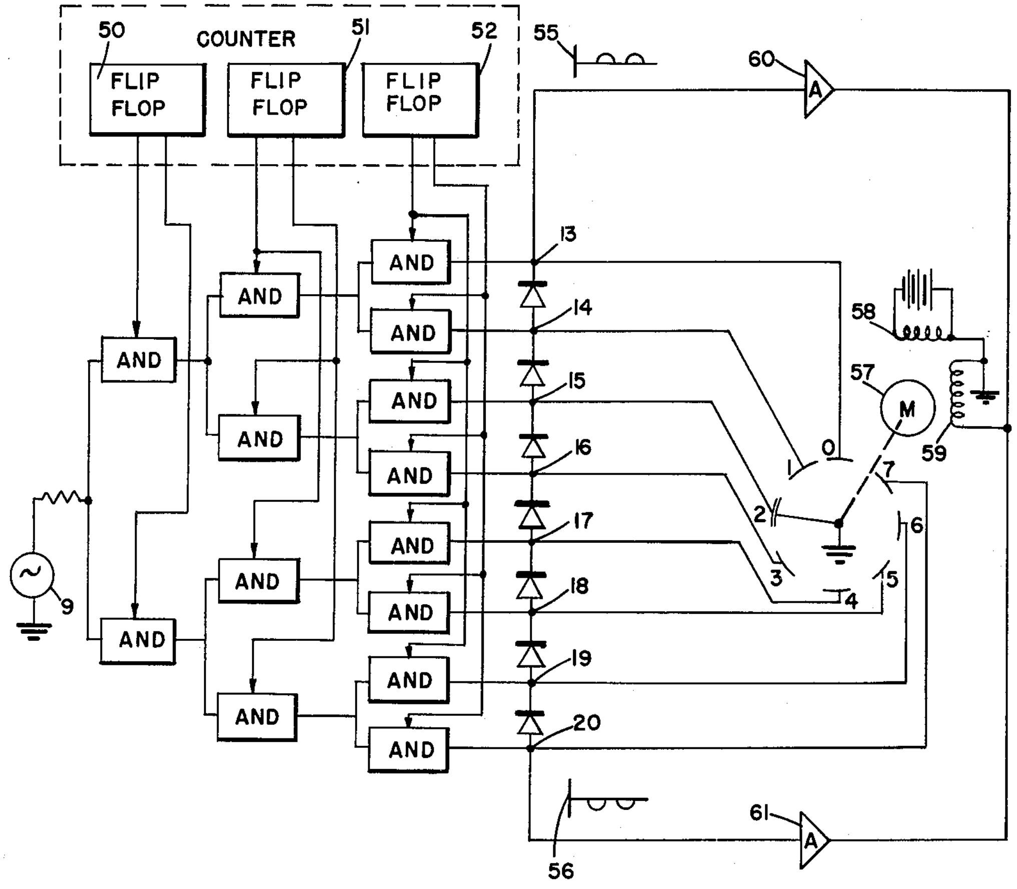
FIG. 3 illustrates the comparison between a counter and an analog value represented by a shaft position and further illustrates the control of the shaft according to the output of the comparator.

In referring to FIG. 3, it may be seen that the diode trees may be replaced by a counter input in which flip flops 50, 51 and 52 controlling "and" gates (which operate much the same as the relay switches of FIGS. 1 and 2), to allow source 9 to be connected to one of the connection points 13 through 20. The switch 45 of FIG. 3 is an octal switch, having eight arcuate sectors which are contacted by contact 43. If the number stored in counter 54 is equal to the number stored in switch 45, no output is received. If the number stored in counter 54 is greater than the number stored in switch 45, a positive output appears at point 13 as illustrated at 55, which output is half-wave rectified, positive current. If the number stored in counter 54 is less than that stored in switch 45, a negative output appears at point 20 as illustrated at 56 which output is a half-wave rectified, negative output. Reversible motor 57 having two field coils 58 and 59 rotate in one direction if an output is received from 13 through amplifier 60 (which acts to isolate output from point 20 from point 13) and in the opposite direction if an output is received from connection 20 through amplifier 61 (which acts to isolate output from point 13 from point 20). Motor 57 is illustrated as being reversible direct current but other types of reversible systems may be used.

If connected in a closed servo loop as shown, the motor 57 will drive switch 43 until no signal is received and the shaft of motor 57 is then at a position which indicates the number in counter 54.

Figure 4:
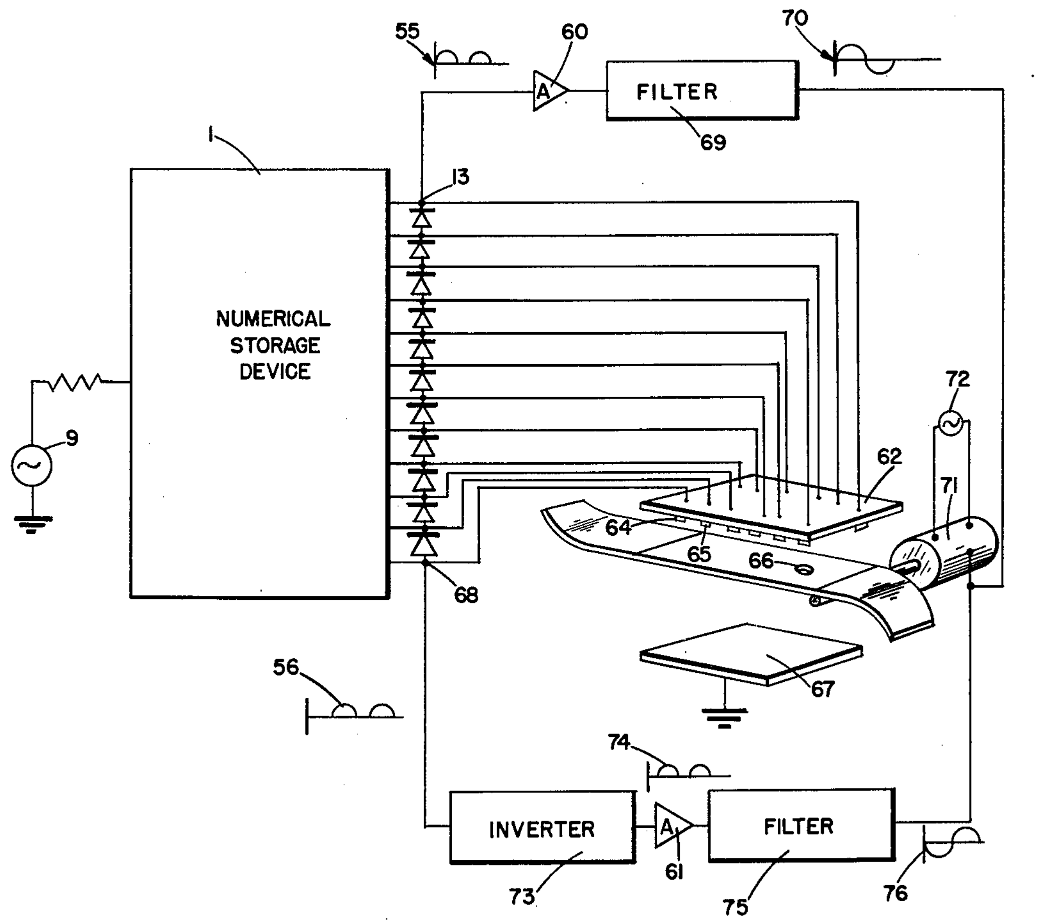
FIG. 4 illustrates the use of the phase output of the device of the comparator for controlling direction of rotation of the motor.

FIG. 4 illustrates how the relay tree 2 of FIG. 1, or the rotatable switch 45 of FIG. 2 may be replaced by a reading head 62 which is adapted to read punch tape 63 by means of contact plungers such as 64 and 65. Upon the existence of a hole such as 66 in the punched tape, electrical contact is made between a specific plunger and grounded plate 67. Such contacts provide an electrical circuit to ground just as the switch contacts 12 or 43 in FIGS. 1, 2 and 3 provided electrical connection to ground. It may be readily understood that other types of storage devices may be utilized, for example, IBM cards or even magnetic discs or tapes, such cards or tape providing control of the circuit in which the alternating current power source 9 is connected. Such IBM cards, tape or electrical switch circuits, may be utilized to replace either of the relay trees 1 or 2 in FIG. 1. Applicant has specifically illustrated how relay tree 2 is replaced by various devices such as switches and tape readers. However, inasmuch as relay trees 1 and 2, FIG. 1, are identical, it is easily understood how the tape readers or switch systems may be substituted for relay tree 1. Essentially, applicant is utilizing the stored information, whether it be in relay trees, counters, tapes or otherwise to complete the electrical circuit from alternating current source 9 to ground.

A further feature, or embodiment of the invention is also illustrated in FIG. 4 in which the two output connections of the device provide signals of different phase. If a signal is received from point 13, its waveform is as illustrated in sketch 55. It is a half-wave rectified, positive signal waves as explained previously in relation to FIG. 3. If a signal is received from point 68, it is a half-wave rectified, negative signal as illustrated at 56. If the wave form received from point 13 is filtered by a wave shaping filter (e.g., a tuned filter) such as 69, a sine wave output, illustrated at 70, is provided to phase reversible motor 71 whose first phase is excited by alternating current source 72 which is in synchronism with alternating current source 9, or which may be the same source. The signal received from point 68 is inverted by inverter 73. The wave illustrated at 74 is obtained, which if filtered by a wave shaping filter 75, the signal illustrated at 76 is obtained, but it may be noted which is 180° out of phase with the wave 70. Therefore, motor 71 will rotate in the direction dictated by the phase of the signal is receives. If the signal is received from point 13, the motor will rotate in one direction and if a signal is received from point 68, the motor will rotate in the opposite direction. The motor will continue to rotate until the number read by reader 62 coincides with the number stored in digital storage device 1. Thus a positioning circuit has been described. One practical utilization of such device is in searching a tape for specific information. Another practical use would be positioning the tape at a particular frame according to an address stored in the digital storage device.

Figure 5:
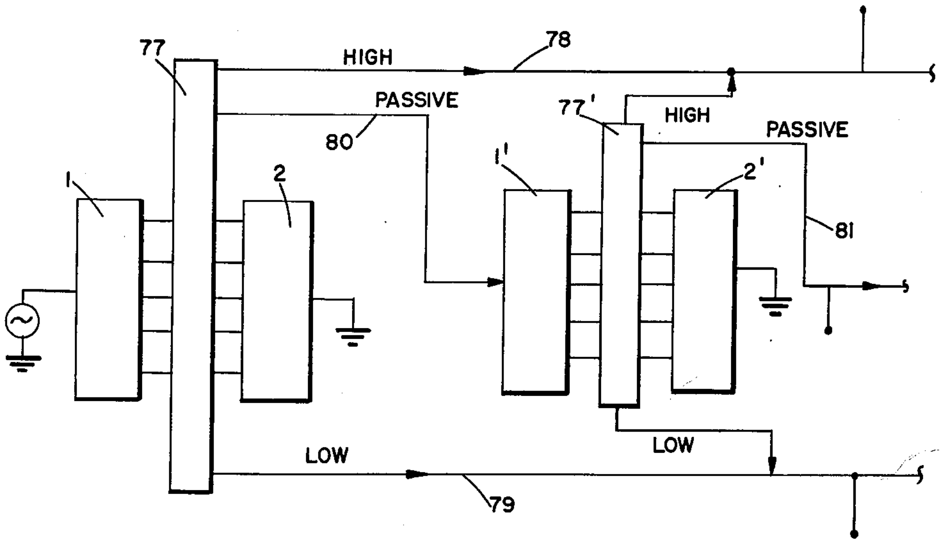
FIG. 5 illustrates the device of the invention used in tandem.

FIG. 5 illustrates tandem use of the device of the invention. A first numerical indicator such as relay tree 1 is compared, as illustrated in prior figures, by comparator 77 with the numerical indicator, or switch, or other device 2. The high output is indicated on line 78 and the low output is indicated on line 79. The passive output (neither high nor low) is indicated on line 80 which serves as an input to numerical indicator or register 1′ which in turn is compared with register or numerical indicator 2′ to provide high indication to line 78 or low indication to line 79 or passive indication on line 81. The output then on line 81 indicates agreement between respective stages connected in tandem. Line 81 may also be connected to a succeeding numerical indicator and thus extension in tandem to any degree is possible.

Applicant has provided by this invention a unique and relatively simple comparator which by reason of its adaptability is able to readily provide indication of the comparability between two numerical indicators. The device of this invention not only provides indication but also provides an electrical signal which is adaptable for closed loop control of either of such numerical values.

Although the invention has been described and illustrated in detail, it is to be clearly understood that the same is by way of illustration and example only and is not to be taken by way of limitation, the spirit and scope of this invention being limited only by the terms of the appended claims.

I claim:

1. An electrical comparator comprising a plurality of diodes connected together in series circuit, said diodes being poled in the same direction, a first switching means operable to provide connection intermediate each of said diodes, means connected to provide alternating current power to said switching means, means for providing control of said switching means, a second switching means operable to provide a return circuit to said alternating current power source, said second switching means connected to provide connections intermediate each of said diodes and means responsive to the current flow at the end connections of said diodes for indicating the relative states of said switching means.

2. The combination recited in claim 1 wherein is included means responsive to the output at each end of said plurality of diodes connected together, for controlling the position of said second switching means.

3. A comparator comprising: first means switchable in response to first digital input signals for providing a different path for current flow to represent each value of the first digital input signals; a series of diodes, one diode for each value of the digital input signals; second means responsive to a second set of digital signals having current shunting connections to said diodes at points corresponding to the values represented by the second digital input signals; first output means coupled to receive a signal from the diode receiving the most significant first digital input signal for producing an output signal indicating when the representation of any of said first digital input signals exceeds that of the corresponding second digital input signal; second output means coupled to the diode associated with the least significant first digital input signal for producing an indication when any of said second digital input signals exceeds the corresponding first digital input signal; and third output means for providing an indication when the representation of value of said first and second sets of digital input signals are equal.

4. A comparator comprising: a plurality of diodes connected to form a series actuable to conduct current in a single direction with output terminals at each end of the series and junction terminals between successive pairs of diodes; a first circuit for applying an input signal to a particular terminal in accordance with a first digital representation; a second circuit for providing shunting paths across said diodes connected to terminals corresponding to a second digital representation; and output means responsive to the direction of signal passage through said terminals for indicating when there is non-equality between said digital representations and for indicating the sense of non-equality.

5. The comparator defined in claim 4 wherein at least one of said circuits comprises binary digital switching means.

6. The comparator defined in claim 4 wherein both of said circuits are binary digital switching means.

7. The comparator defined in claim 4 wherein said output means includes means for detecting voltage of one polarity at one end of said diode series to represent one sense of non-equality and for detecting voltage of the opposite polarity at the other end of said diode series to represent the other sense of non-equality.

8. The comparator defined in claim 4 wherein said output means includes first, second and third sensing devices for detecting comparisons of greater than, less than, and equal to.

9. The comparator defined in claim 4 wherein said input signal is alternating current and said output means includes a first device coupled to one of said ends for detecting one direction of A.C. current flow and includes a second device coupled to the other end for detecting the other direction of A.C. current flow.

10. The comparator defined in claim 4 wherein there is further included means responsive to signals derived through said output terminals for modifying one of said digital representations to cause equality between said digital representations.

References Cited in the file of this patent

UNITED STATES PATENTS

| | | |
|---|---|---|
| 2,529,723 | Chevallier | Nov. 14, 1950 |
| 2,641,696 | Woolard | June 9, 1953 |
| 2,702,380 | Brustman et al. | Feb. 15, 1955 |
| 2,749,440 | Cartwright | June 5, 1956 |
| 2,752,489 | Aigrain | June 26, 1956 |
| 2,763,854 | Oliwa | Sept. 18, 1956 |
| 2,803,703 | Sherwin | Aug. 20, 1957 |
| 2,844,310 | Cartwright | July 22, 1958 |
| 2,873,439 | Lahti et al. | Feb. 10, 1959 |